US008473409B2

(12) United States Patent
Erbey et al.

(10) Patent No.: US 8,473,409 B2
(45) Date of Patent: Jun. 25, 2013

(54) METHOD AND SYSTEM FOR LOAN CLOSING

(75) Inventors: William C. Erbey, Atlanta, GA (US); Christopher Kennedy, Lake Worth, FL (US); Bryan Hurley, Lake Worth, FL (US)

(73) Assignee: Altisource Solutions S.à r.l., Luxembourg (LU)

( * ) Notice: Subject to any disclaimer, the term of this patent is extended or adjusted under 35 U.S.C. 154(b) by 0 days.

(21) Appl. No.: 13/232,010

(22) Filed: Sep. 14, 2011
(Under 37 CFR 1.47)

(65) Prior Publication Data
US 2012/0005071 A1    Jan. 5, 2012

Related U.S. Application Data

(63) Continuation of application No. 11/802,306, filed on May 22, 2007, now Pat. No. 8,024,261, which is a continuation-in-part of application No. 10/937,879, filed on Sep. 10, 2004, now Pat. No. 7,707,055.

(60) Provisional application No. 60/802,111, filed on May 22, 2006, provisional application No. 60/502,273, filed on Sep. 12, 2003.

(51) Int. Cl.
*G06Q 40/02* (2012.01)
(52) U.S. Cl.
USPC .......... 705/38; 705/35; 705/37; 705/39
(58) Field of Classification Search
USPC .................. 705/1, 37, 35, 38, 39
See application file for complete search history.

(56) References Cited

U.S. PATENT DOCUMENTS

| | | | |
|---|---|---|---|
| 4,799,156 | A | 1/1989 | Shavit et al. |
| 5,592,375 | A | 1/1997 | Salmon et al. |
| 5,734,890 | A | 3/1998 | Case et al. |
| 5,758,328 | A | 5/1998 | Giovannoli |
| 5,799,289 | A | 8/1998 | Fukushima et al. |
| 5,940,812 | A | 8/1999 | Tengel et al. |
| 5,995,947 | A | 11/1999 | Fraser et al. |

(Continued)

FOREIGN PATENT DOCUMENTS
WO    0115047 A1    3/2001

OTHER PUBLICATIONS

"The Growth of Internallized Vendor Management Subsidiaries", www.atmprof.com, Mar. 31, 2005, pp. 1-2.

(Continued)

*Primary Examiner* — Jagdish Patel
(74) *Attorney, Agent, or Firm* — Shaun B. Sethna

(57) ABSTRACT

A method and system for electronically facilitating loan closing transactions that include sub-transactions involving third parties. The method and system provide functionality to quickly and easily order a sub-transaction and bill the respective party, or pay for the sub-transaction directly from various payment systems. An interactive closing document updates automatically as different services and sub-transactions are ordered. Designated parties to the transaction make and approve changes and updates to the interactive document as sub-transactions are completed and billed. The interactive document receives information from the earlier stages of the loan or mortgage transaction, and incorporates the information into the interactive closing document. Upon approval by all parties, at the closing of the transaction, the interactive closing document is generated as a hard copy for signature.

19 Claims, 4 Drawing Sheets

U.S. PATENT DOCUMENTS

| | | | |
|---|---|---|---|
| 6,513,019 B2 | 1/2003 | Lewis | |
| 6,594,633 B1 * | 7/2003 | Broerman | 705/313 |
| 6,606,606 B2 | 8/2003 | Starr | |
| 6,647,374 B2 | 11/2003 | Kansal | |
| 6,711,554 B1 * | 3/2004 | Salzmann et al. | 705/64 |
| 6,985,886 B1 | 1/2006 | Broadbent et al. | |
| 7,072,857 B1 | 7/2006 | Calonge | |
| 7,089,503 B1 | 8/2006 | Bloomquist et al. | |
| 7,107,241 B1 | 9/2006 | Pinto | |
| 7,349,868 B2 | 3/2008 | Tenorio | |
| 7,389,242 B2 | 6/2008 | Frost | |
| 7,392,216 B1 | 6/2008 | Palmgren et al. | |
| 7,444,302 B2 | 10/2008 | Hu et al. | |
| 7,451,106 B1 | 11/2008 | Gindlesperger | |
| 7,555,459 B2 | 6/2009 | Dhar et al. | |
| 7,707,055 B2 | 4/2010 | Behmoiras et al. | |
| 7,707,071 B2 | 4/2010 | Rigole | |
| 7,707,153 B1 * | 4/2010 | Petito et al. | 707/999.101 |
| 8,024,261 B2 | 9/2011 | Erbey et al. | |
| 2002/0023046 A1 | 2/2002 | Callahan et al. | |
| 2002/0040339 A1 | 4/2002 | Dhar et al. | |
| 2002/0052835 A1 | 5/2002 | Toscano | |
| 2002/0138413 A1 * | 9/2002 | Creamer et al. | 705/38 |
| 2002/0188483 A1 | 12/2002 | Fisher | |
| 2003/0004854 A1 | 1/2003 | Greene et al. | |
| 2003/0018558 A1 | 1/2003 | Heffner et al. | |
| 2003/0018575 A1 | 1/2003 | Beggins et al. | |
| 2003/0033587 A1 | 2/2003 | Ferguson et al. | |
| 2003/0101085 A1 | 5/2003 | Butler, III et al. | |
| 2003/0233316 A1 | 12/2003 | Hu et al. | |
| 2004/0019528 A1 | 1/2004 | Broussard et al. | |
| 2004/0083119 A1 | 4/2004 | Schunder et al. | |
| 2004/0083148 A1 | 4/2004 | Chadrow | |
| 2004/0088411 A1 | 5/2004 | Jakubowski et al. | |
| 2004/0111346 A1 | 6/2004 | MacBeth et al. | |
| 2004/0249705 A1 * | 12/2004 | Spencer et al. | 705/14 |
| 2004/0249914 A1 | 12/2004 | Flocken et al. | |
| 2005/0010423 A1 | 1/2005 | Bagbey et al. | |
| 2006/0155640 A1 | 7/2006 | Kennedy et al. | |
| 2006/0190394 A1 | 8/2006 | Fraser et al. | |
| 2009/0240596 A1 | 9/2009 | Kennedy et al. | |
| 2010/0268558 A1 | 10/2010 | Behmoiras et al. | |

OTHER PUBLICATIONS

"Vendor Management Subsidiary Strategic Benefits", www.atmprof.com, Mar. 31, 2005, pp. 1-2.

"MindBox," ARTEnterprise, 2005, 8 pages.

"Ocwen Unveils Enhanced Vendor Management Tool for Mortgage," www.press.arrivenet.com, Mar. 24, 2005, pp. 1-2.

American Land Title Association, "Alta Technology New," pp. 2, Jul. 10, 2007, http://www.alta.org/technology/news.cfm?newsID=5187.

Dorado White Paper, "The Dorado Advantage-Networked Origination for the Agile Enterprise," 12 pages, 2006.

Final Office Action, dated Nov. 30, 2010, from corresponding U.S. Appl. No. 11/802,308.

Final Office Action, dated Oct. 21, 2010, from corresponding U.S. Appl. No. 11/301,247.

Final Office Action, dated Oct. 28, 2009, from corresponding U.S. Appl. No. 11/301,247.

Final Office Action, dated Sep. 16, 2008, from corresponding U.S. Appl. No. 11/301,247.

Metavante Lending Solutions, "Loan Origination Studio: Metavante Lending Solutions", 2007, 10 pages, http://www.ghrsystems.com/ProductsServices/mortgage.sub.--solutionsighrs-ub.--los.html.

Mortgage Cadence Enterprise Lending Solutions, "Mortgage Cadence Orchestrator (Business Components)", 2007, 4 pages, http://www.mortgagecadence.com/productsOrchestrator.asp.

Notice of Allowance dated Oct. 21, 2011, from corresponding U.S. Appl. No. 12/335,196.

Office Action, dated Apr. 21, 2011, from corresponding U.S. Appl. No. 12/335,196.

Office Action, dated Jan. 25, 2012, from corresponding U.S. Appl. No. 12/335,196.

Office Action, dated Mar. 18, 2010, from corresponding U.S. Appl. No. 11/802,308.

Office Action, dated Mar. 24, 2008, from corresponding U.S. Appl. No. 11/301,247.

Office Action, dated Mar. 24, 2009, from corresponding U.S. Appl. No. 11/301,247.

Office Action, dated Mar. 3, 2010, from corresponding U.S. Appl. No. 11/301,247.

Related Case—U.S. Appl. No. 11/802,308, entitled "Method and System for Mortgage Exchange,", filed May 22, 2007, now abandoned.

Related Case—U.S. Appl. No. 13/076,044, filed Mar. 30, 2011, entitled "Method and System for Mortgage Exchange."

Scott Kersnar, "Putting All the Pieces Together," SourceMedia Inc. and Mortgage Technology, vol. 13, No. 6, Jul. 2006.

Final Office Action, dated Sep. 26, 2012, from corresponding U.S. Appl. No. 12/723,358.

Notice of Allowance, dated May 24, 2012, from corresponding U.S. Appl. No. 13/076,044.

Office Action, dated Apr. 27, 2012, from corresponding U.S. Appl. No. 12/723,358.

* cited by examiner

METHOD AND SYSTEM FOR LOAN CLOSING

CLAIM OF PRIORITY

This application is a continuation of U.S. application Ser. No. 11/802,306, filed May 22, 2007, which claims the benefit of Provisional Application Ser. No. 60/802,111 filed May 22, 2006, and is also a continuation-in-part application of U.S. application Ser. No. 10/937,879 entitled "METHOD AND SYSTEM FOR VENDOR MANAGEMENT," filed Sep. 10, 2004, now U.S. Pat. No. 7,707,055, issued Apr. 27, 2010, which claims the benefit of Provisional Application Ser. No. 60/502,273 filed Sep. 12, 2003. Each of the above-mentioned patent applications is incorporated in its entirety by reference herein.

BACKGROUND OF THE INVENTION

1. Field of the Invention

The present invention relates to a method and system for managing financial transactions that require goods or services from multiple vendors and, in particular, to methods and systems for facilitating real estate closing transactions.

2. Background of the Technology

There exist in the art paper-based methods and systems for completing real estate closing transactions, but these systems are usually inefficient, and are bound by the limitations of traditional paper-based systems. Some computer-implemented systems for managing real estate closing transactions are known, but these systems typically do not possess the functionality required to seamlessly manage all the steps that comprise the closing of a financial transaction. Many financial institutions and other vendors rely on existing accounts payable systems to manage closing transactions, which is inefficient. Moreover, existing computer-implemented systems for managing real estate closing transactions typically suffer from the disadvantage of difficult and cumbersome integration of the various payment methods utilized by different parties to the transaction. For example, in current systems, it is difficult to integrate payments by paper check, direct deposit, and electronic transfers, among others.

Furthermore, a real estate closing transaction must normally be accomplished within a limited time-frame. Speed and efficiency are key features of any computer-implemented system for management of real estate closing transactions. Currently, real estate closing transactions involve completion of standard settlement forms, such as the HUD-1 published by the United States Department of Housing and Urban Development, or other similar forms. (The HUD-1 is a standard form that is available from a variety of public sources). Parties to any federally supported mortgage must present an executed HUD-1 document to complete the closing transaction.

A typical accounts payable system, however, cannot easily transfer transaction information into a HUD-1 form, and the information must instead be completed manually, adding time and costs to the transaction. For example, the financial institution must either generate the HUD-1, or outsource the HUD-1 generation to a document preparation company, which would normally convert the handwritten HUD-1 document into electronic form, such as in PDF (Portable Document Format) or TIFF (Tagged Image File Format) format. The converted document is transmitted to the broker, who makes additional changes/updates (e.g., electronically or manually), and returns the document to the financial institution. The financial institution (e.g., through the document preparation company) re-generates the HUD-1, and transmits it to the title company, which also makes changes/updates to the HUD-1. This process is repeated until all parties have reviewed, modified, and approved the final document. If one party to the transaction does not approve the changes made by another party, the party that proposed the changes must be notified, and a new copy of the document circulated. Finally, once all of the changes are entered, accepted, and finalized, the financial institution (e.g., through the document preparation company) prepares the final HUD-1 for use during the closing transaction, thus bringing to completion this labor-intensive, cumbersome, and costly process.

Systems and methods for completing closing transactions over the telephone are also known, but they require additional advance scheduling to ensure that all parties are available for telephone conferences at the same time, and thus provide, at best, only a marginal increase in overall efficiency.

For the purposes of this application, "financial institutions" include banks, investment companies, real estate lenders, investment and holding companies, and any commercial entity engaged in the business of financing loans or mortgages. "Brokers" include brokerages, real estate agents, corporate land purchasers, and any commercial entity, individual or otherwise, engaged in the business of buying and selling real property. "Potential borrower" or "borrower" and "potential customer" or "customer" are used interchangeably herein to describe any person seeking to acquire a mortgage or loan (e.g., by employing the services of a broker or financial institution). "Closing" and "closing transaction" refer to the set of transactions commonly associated with "closing" on a real estate transaction, that is, completing all the paperwork and necessary steps to finalize the transaction of exchanging property for value.

Sub-transactions define the parameters of the transaction or otherwise bring the underlying transaction to completion. Sub-transactions include transactions between the end users of the system (e.g., brokers, financial institutions and potential borrowers) and vendors, such as inspection companies or closing companies that have service agreements with end users or other involved parties.

There is an unmet need in the art for methods and systems for the efficient management of loan closing transactions.

There is a further need in the art for methods and systems that provide the capability of integrating individual party requirements with respect to payment methods and timing.

There is a further need in the art for methods and systems that provide interactive updatable computerized standardized settlement forms, such as the HUD-1, or other similar forms.

There is a further unmet need in the art for methods and systems that seamlessly integrate all processes involved in a real estate closing transaction, including creation and circulation of all documents and forms involved among all parties to the transaction.

SUMMARY OF THE INVENTION

The present invention meets the above needs, as well as others, by providing methods and systems for efficient management of loan closing transactions. The present invention provides a method and system for managing multiple vendors, handling individual requirements regarding payments and timing of payments, and managing closing costs paid by various parties. The method and system of the present invention have the capability of interfacing with existing accounts payable systems, and have the functionality of interfacing directly with multiple direct deposit systems, including Ocwen Financial Corporation's proprietary system RealRemit. The present invention also provides methods and systems that interface and manage escrow accounts, which are commonly required in mortgage closing transactions. The method and system of the present invention further store and organize available information from the parties involved in the closing and from third party vendors that provide goods and/or services to the parties, and provide that information in a readily available manner.

The method and system of the present invention provide an interactive computerized standardized settlement form, such as the HUD-1 (interchangeably referred to herein as the "interactive HUD-1"). Unlike a paper HUD-1, the interactive HUD-1 is stored within the system and may be displayed at any time upon a request from a party. The method and system of the present invention grant at least partial access to the interactive HUD-1 to parties involved in the loan closing transaction, and also sub-transaction vendors, at the request of a party. For example, in one embodiment of the present invention, access of third party vendors may be restricted to certain parts of the interactive HUD-1, if the parties to the transaction wish to keep other parts of the information confidential.

In one embodiment of the present invention, transaction parties may access the system and update the interactive HUD-1. For example, upon logging into the system, a party must provide adequate authentication (e.g., a password), and may then request to change or add a specific value within the interactive HUD-1.

One embodiment of the present invention provides systems and methods for managing funds used to pay closing costs accrued through the life cycle of the transaction. In a typical loan closing transaction, settlement charges must be calculated, and the settlement form must include details about the specific settlement charge and the account from which the settlement charge is to be paid, whether the paying account is the borrower's funds, the seller's funds, the financial institution's funds, or an escrow account. Using information gathered from outside or preliminary loan services and information received from management of sub-transactions used to complete the loan closing, the present invention calculates these costs and integrates them into a settlement form, such as the HUD-1.

One embodiment of the present invention enables management and generation of closing documents. In some instances, the parties will not generate a set of closing documents for final signature until certain conditions have been met. Once the parties specify these conditions, the present invention delays closing document generation until the conditions are met. The system checks the predetermined conditions at regular intervals to obtain status information, and generates the closing documents only when the predetermined conditions are met, subject to built-in overrides that may be employed only by system users having proper authorization.

Among other advantages, the present invention maximizes process efficiencies and reduces customer costs by automating processes in the transaction management life cycle. Specifically, the present invention keeps track of all fees accrued and paid during the entire life cycle of the loan. When the loan is ready for closing, the present invention generates a list of all the fees that are due and that have been paid.

Additional advantages and novel features of the invention will be set forth in part in the description that follows, and in part will become more apparent to those skilled in the art upon examination of the following or upon learning by practice of the invention.

DETAILED DESCRIPTION

Figure 1:
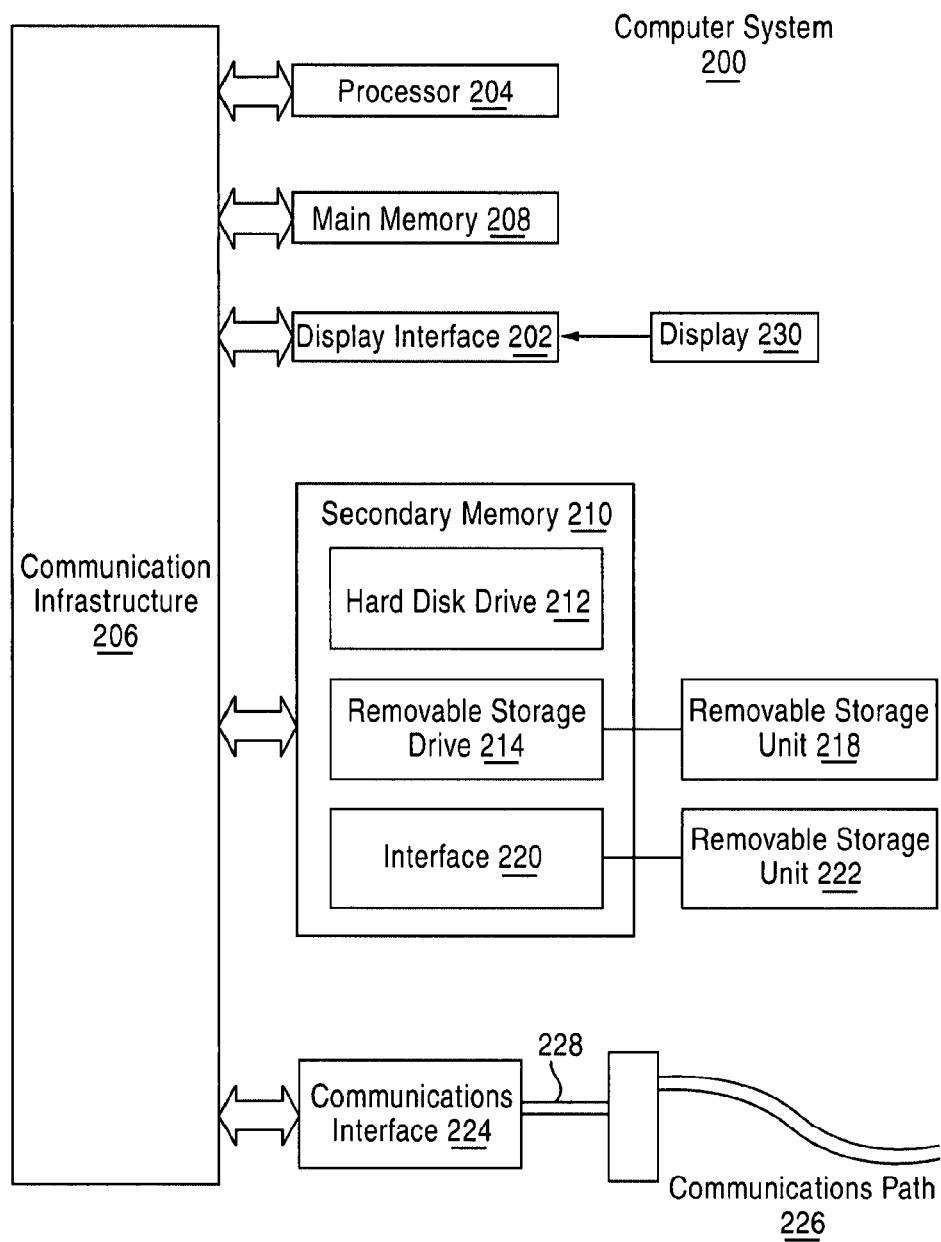
FIG. 1 is an example flow diagram of the process of one embodiment of the current invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 1.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

The computer system 200 includes a user interface 202 that forwards graphics, text, and other data from the communication infrastructure 206 (or from a frame buffer not shown) for display on a display unit 230. The computer system 200 also includes a main memory 208, preferably a random access memory (RAM), and may also include a secondary memory 210. The secondary memory 210 may include, for example, a hard disk drive 212 and/or a removable storage drive 214 such as a floppy disk drive, a magnetic tape drive, an optical disk drive, etc. The removable storage drive 214 reads from and/or writes to a removable storage unit 218, which may also be a floppy disk, magnetic tape, optical disk, etc., in a well known manner. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such devices may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this specification, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 2:
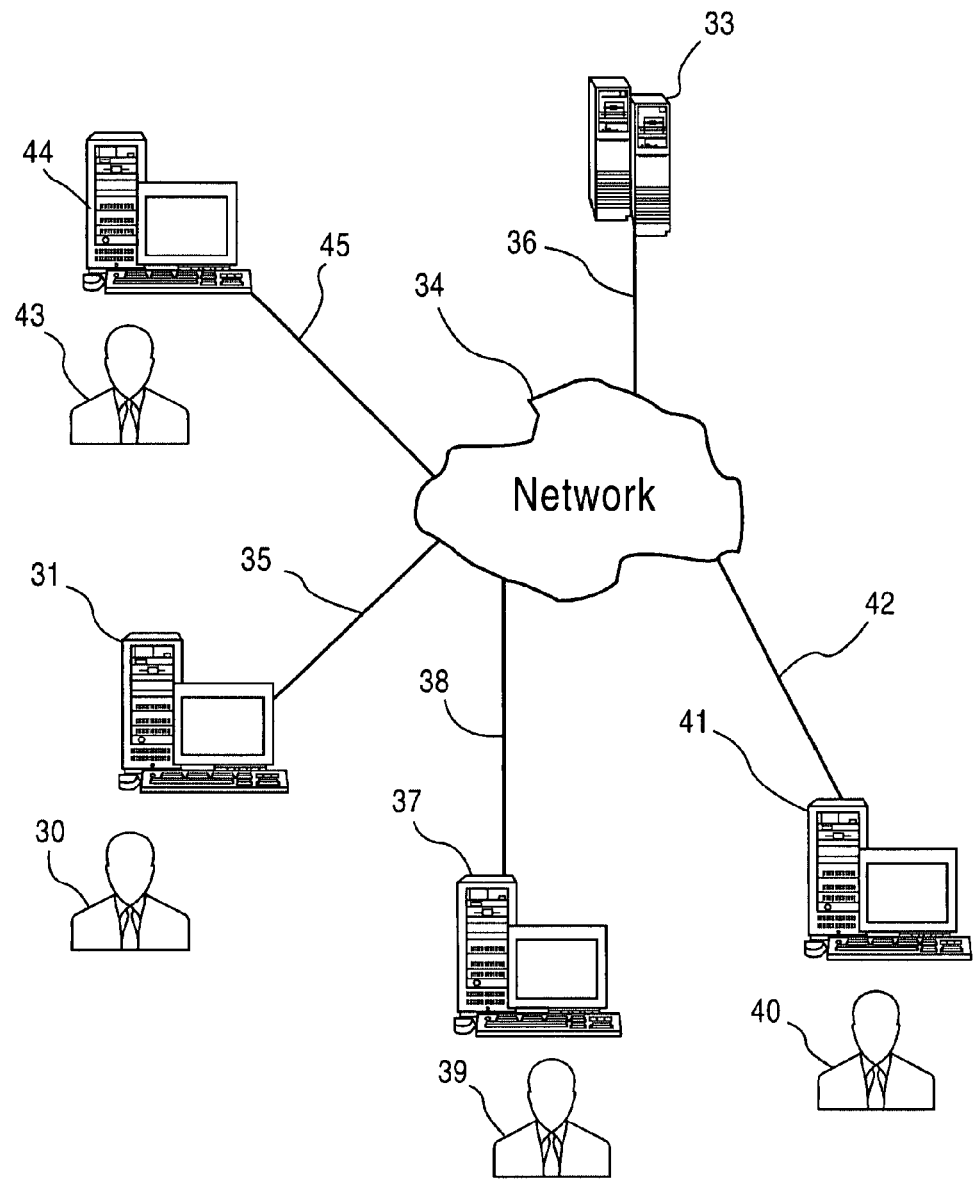
FIG. 2 is a flowchart describing the process of updating the interactive HUD-1 form used in conjunction with one embodiment of the present invention.

FIG. 2 presents an exemplary system diagram of various hardware components and other features in accordance with an embodiment of the present invention. As shown in FIG. 2, in an embodiment of the present invention, data and other information and services for use in the system is, for example, received from an end user 30 via a terminal 31. The terminal 31 is coupled to a server 33 via a network 34, such as the Internet, via couplings 35, 36. In one embodiment, a vendor 39 also inputs information/data via a terminal 37, via coupling 38, to the network 34. Furthermore, in one embodiment, a member of an outsourced workforce 40 inputs information/data via a terminal 41, via coupling 42, to the network 34, and in another embodiment, a member of a financial institution workforce 43 inputs information/data via a terminal 44 to the network 34 via coupling 45.

Each of the terminals 31, 37, 41, 44 comprises, for example, a personal computer (PC), minicomputer, mainframe computer, microcomputer, telephone device, personal digital assistant (PDA), or other device having a processor and input capability. Server 33 comprises a PC, minicomputer, mainframe computer, microcomputer, or other device having a processor and a repository for data or connection to a repository for maintained data.

In operation, according to an embodiment of the present invention, via the network 34, vendor data, transactional data, sub-transactional data, order data, and/or other information are communicated with the server 33. The server 33 receives and resolves transactions, including triggering and resolving sub-transactions, storing data regarding the transaction, vendor, and sub-transaction, and documenting the transaction (e.g., electronically).

In one embodiment, the present invention uses active server page (ASP) technology to deliver information and services to a user. This embodiment may include one or more ASPs stored on the server 33. Such approach reduces the maintenance expense and hardware expense, and results in limited implementation integration costs, limited support expense, and low total cost of ownership.

In one embodiment of the present invention, information relating to a transaction, such as a loan, is stored electronically. This information is referred to interchangeably herein as a virtual loan file. Among other features, the virtual loan file enables data mining, reduces post closing quality reviews, facilitates secondary market due diligence, streamlines loan servicing functions, reduces data archiving costs, reduces processing costs, automates routine and decision based processes, and reduces data entry errors.

Figure 3:
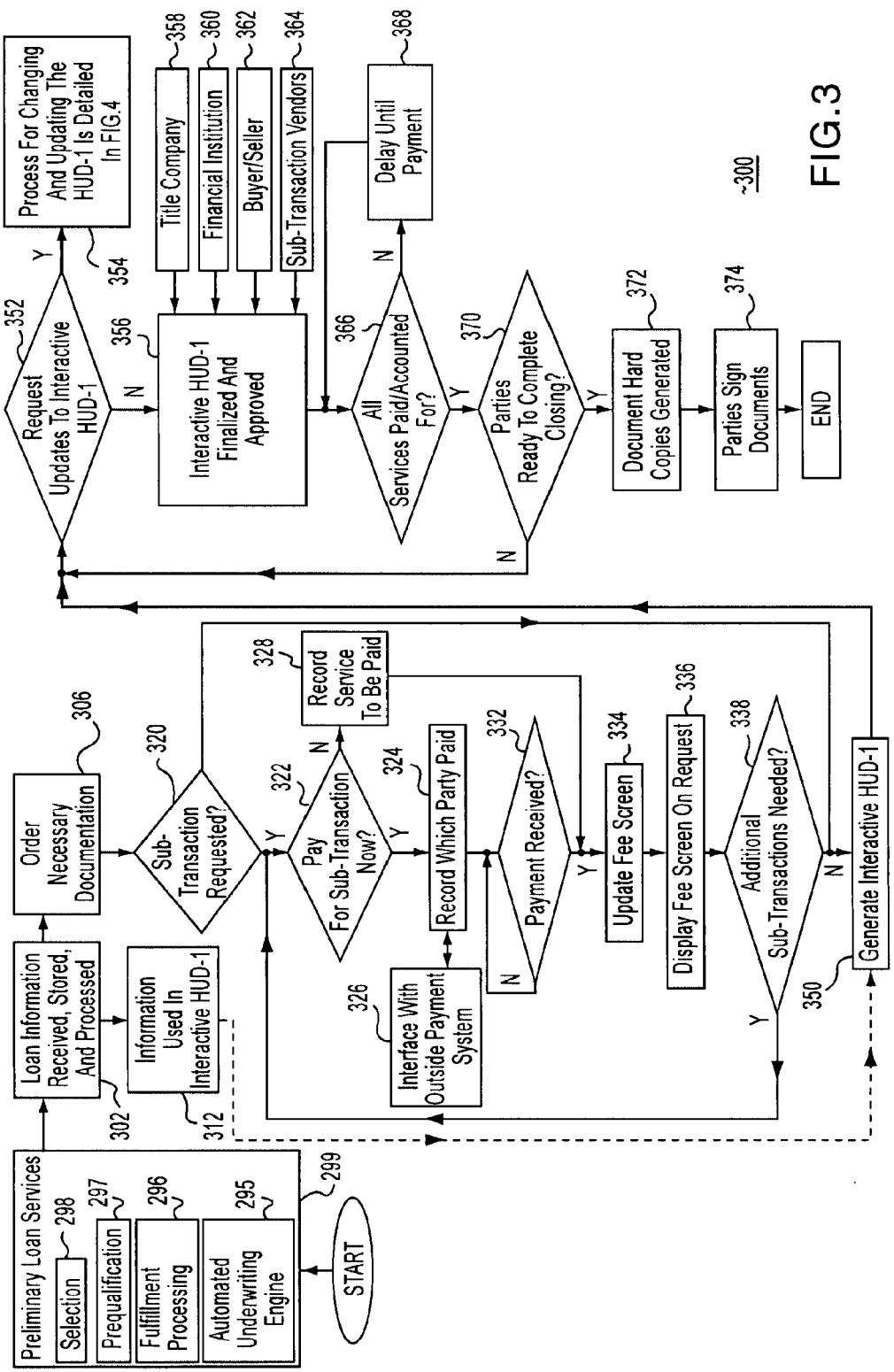
FIG. 3 presents an exemplary computer system implementation capable of carrying out the functionality of the current invention.

The loan closing method and system of one embodiment of the present invention will now be described with reference to FIG. 3. Process 300 of FIG. 3 starts with a preliminary loan services module 299 that executes some of the actions involved in completing a loan transaction. In one embodiment, the preliminary loan services 299 may be executed by a Mortgage Exchange system, described in U.S. patent application Ser. No. 11/802,308, entitled "Method and System for Mortgage Exchange," filed May 22, 2007, now abandoned. The entirety of which is incorporated by reference herein.

Although the preliminary loan services 299 may vary based upon system implementation, these services typically include components such as loan selection 298, prequalification 297, fulfillment processing 296, and automated underwriting 295. The loan closing system and method of the present invention provide seamless integration with these preliminary loan services 299, thereby providing efficient communication between the preliminary loan services 299 and the loan closing process.

Upon completion of the preliminary loan services 299, loan information is seamlessly transferred to a receiving, storing, and processing unit 302 for later use in a settlement form 312, such as the interactive HUD-1. The process 300 of the present invention then orders necessary documentation at step 306, including, for example, title to the property, the property appraisal, and other related documents.

In one embodiment, once the necessary documentation is ordered, the process 300 determines, at step 320, whether it is necessary to order and monitor any third party sub-transactions to complete the loan transaction. Depending on the implementation of the system, some sub-transactions may be ordered automatically, or individually/manually ordered by parties to the transaction. Examples of third party sub-transactions include inspections, appraisals, title searches, document preparations, title insurance preparation, and tax assessment, among others.

In one embodiment, if a third party sub-transaction is ordered, the system of the present invention determines a time frame for payment to be made to the third party at step 322. The third party may require payment, for example, before or after the service, or at closing. Additionally, an administrator of the system may have a preference for payment before or after the service, or at closing. Upon specification of inconsistent payment requirements, one embodiment of the present invention triggers an alternate form of payment, such as funds transfer from an escrow account, an accounts payable system, or credit payment system.

One embodiment of the present invention tracks the entity responsible for the payment (e.g., the buyer, seller, vendor or other party to the transaction). At step 322, if payment is required immediately, the system of the present invention records the party making the payment for the service at step 324, and triggers an interface with a payment system 326 that the party has elected to use to pay. Preferably, the payment system 326 is an outside payment system. In one embodiment of the invention, the outside payment system 326 is fully customizable, and may include any payment option, such as hand-written checks or credit card payments. The present invention is designed to cooperate with a number of outside systems for delivering payment to appropriate vendors. Unlike similar systems, however, the present invention keeps track of all the fees associated with the loan closing, regardless of whether they have been paid or are pending. The present invention also tracks payments for sub-transactions and automatically updates related forms, keeping a list of fees in a centralized repository for easy access and display. This list is then incorporated into an interactive settlement form, such as an HUD-1 form.

One embodiment of the present invention interfaces with multiple types of payment systems for third parties who deliver goods and services, including, but not limited to, direct deposit and/or other electronic funds transfer systems, accounts payable systems implemented by commercially available accounts payable managers, and paper-based systems for writing checks and tracking fees by hand. A method for vendor payment can be selected based on vendors' or parties' preferences.

If the immediate payment is required, the present invention regularly checks whether the payment has been received. In one embodiment, the system automatically prevents the generation of any closing documents, if payment is not received at step 332, unless the vendor or other authorized party overrides the system. Once payment is received, the system updates the fee screen, as shown at step 334. If immediate payment is not required at step 322, the system of the present invention records a incurred fee at step 328, and makes a note that such fee requires calculation and must be accounted for in the closing costs and in the final closing document. Regardless of whether payment was made, the fee screen is viewable by the parties upon request at step 336. In one embodiment, access to this feature may be limited, depending on the specific party's authorization to view the fee screen.

Once the system updates the fee screen at step 334 and processes the necessary information, the system and/or process 300 determines whether additional third-party services are needed or have been ordered at step 338. If additional sub-transactions are needed, the system repeats the process of requesting sub-transactions and managing payment, as described above. If additional third party services are not required, the system generates the interactive HUD-1 at step 350 as described above. Preferably, in generating the interactive HUD-1, the system of the present invention receives information about the loan from outside system 312. The system also processes all fees (whether paid or unpaid) and fee information, and incorporates this data into the HUD-1.

Unlike traditional HUD-1s, embodiments of the present invention permit parties to a transaction to change/update the interactive HUD-1. These changes/updates do not need to be limited to one host system, computer, or network; rather the interactive HUD-1 may be viewed from any computer capable of connecting to the system. This permits parties to the transaction to make changes to the document from any location, regardless of physical proximity to the property or the parties involved in the transaction.

The interactive HUD-1 can also be updated by requests for changes as shown at step 352. The procedure for making changes, at step 354, to the interactive HUD-1 is described in more detail in conjunction with FIG. 4, discussed below.

At step 356, if all changes/updates to the interactive HUD-1 have been made, the HUD-1 is finalized with input, for example, from title company 358, financial institutions 360, buyer and seller 362, and vendors of sub-transactions 364, among others. In one embodiment of the present invention, depending on the specifications of the system and the preferences of the parties to the transaction(s), one or more of the parties is required to approve the interactive HUD-1 before it is generated in final form.

In one embodiment of the present invention, after the HUD-1 has been approved and finalized at step 356, the system executes a process to verify that all ordered services have been paid or otherwise accounted for and/or that the parties have obtained all necessary financing at step 366.

If not all services have been paid for, in one embodiment, the present invention will not generate printed HUD-1 documents until the respective party receives payment as shown at step 368. At steps 366 and 370, once all services and payments have been accounted for, the system makes a determination regarding whether the parties are ready to complete the closing transaction. If all parties are ready, the system generates paper copies of the closing documents at step 372 so that the parties can sign and finalize the closing transaction at step 374. At step 370, if the parties are not ready for closing and signing 370, the present invention delays the generation of paper HUD-1 documents until all actions required to complete the interactive HUD-1 are completed.

In one embodiment of the present invention, all decisions by the system to delay the closing transaction may be overridden by any party that has been granted authorization to do so.

One embodiment of the present invention allows complete customization for the party who approves changes to the interactive HUD-1. For example, in one embodiment, the approving party remains the same regardless of the specific transaction taking place. In another example, the approving party changes depending on the preferences of the parties involved in the specific transaction. One embodiment of the present invention allows for an additional approval step before updating the interactive HUD-1. For example, if an appraiser receives an order for an appraisal, once the appraisal is completed, the appraiser is granted access to the system, so that the appraiser can enter the fee information, and the interactive screen can be updated.

In one embodiment of the present invention, when a fee is entered or changed, the system notifies the party ultimately responsible for payment. The responsible party then decides whether or not to approve. If approval is not provided, the appraiser is notified that the fee was not approved. If the fee is approved, the process continues as described above.

Depending on agreements between the parties, any fee associated with the transaction may be paid by any interested party. In one embodiment of the present invention, the system can be customized to allow different parties or multiple parties to approve each fee or service. Additionally, the party responsible for the payment of the fee may remain undetermined until the closing document is finalized. By using an escrow account, for example, the present invention can effectively manage costs and maintain control of the transaction.

Some transaction fees and costs must be paid at the time the potential borrower applies for the loan. For example, these costs typically include the application fee, the credit report fee, and the appraisal fee. Although these costs are paid long before the closing transaction takes place, these costs must also be reflected in the interactive HUD-1 document. Some costs are paid outside of the closing fee, even though they appear in the interactive HUD-1 form. These costs are referred to as "P.O.C.", or "paid outside closing," and must appear in the document. The present invention tracks these costs, as well, and displays them on the interactive HUD-1.

When most financial institutions approve a loan, the borrower is required to pay for some items that will become due after closing. These prepaid items may include, for example, insurance premiums for fire and hazard, homeowner's insurance, private mortgage insurance for the lender and/or the borrower, and real estate taxes. The financial institution can require that the money be held in an escrow account, in which case the present invention will interface with that escrow account and reflect that information on the interactive HUD-1.

Figure 4:
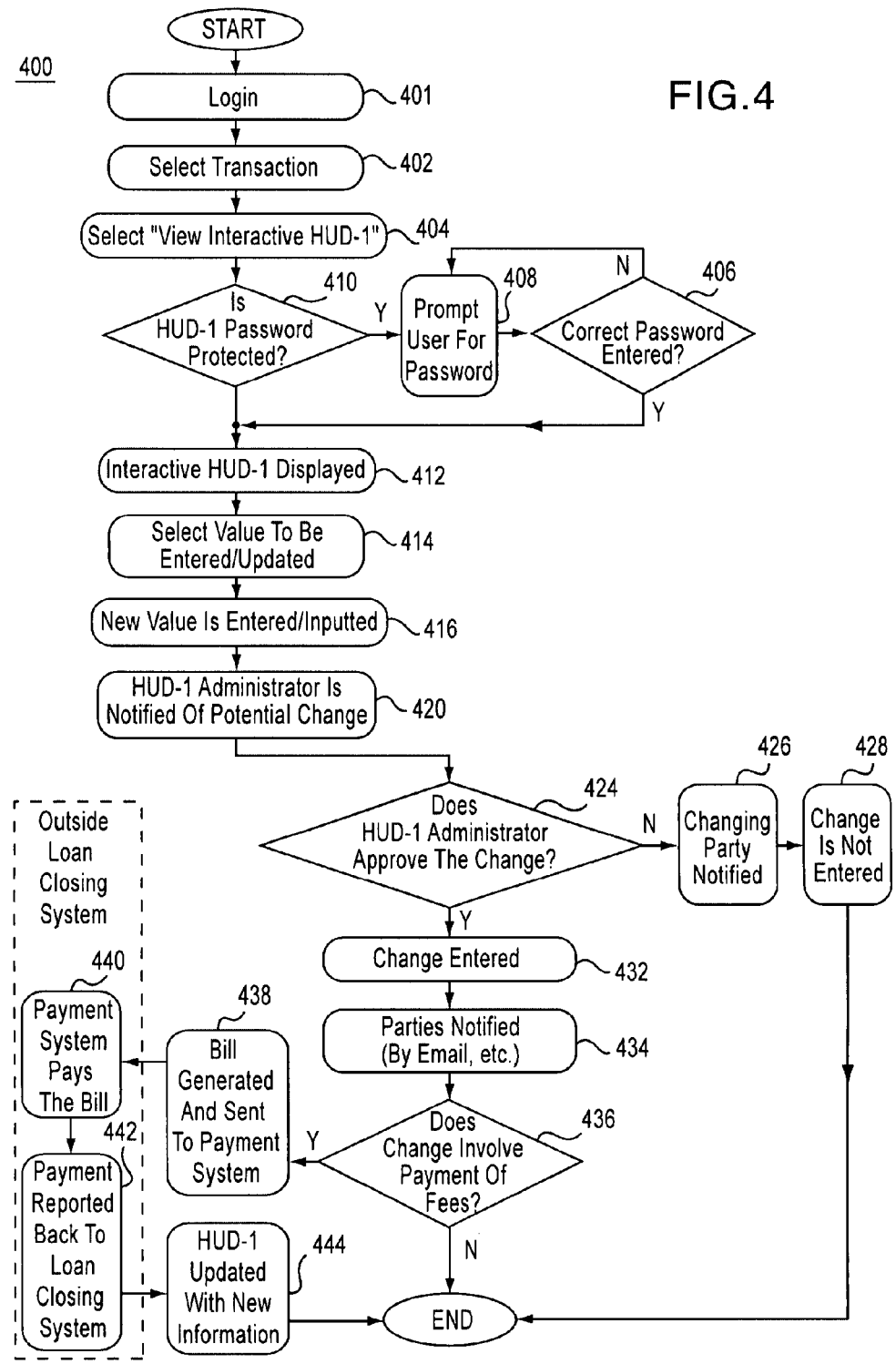
FIG. 4 presents an exemplary system diagram of various hardware components and other features in accordance with an embodiment of the present invention.

Process of updating the interactive HUD-1 form implemented in one embodiment of the present invention will now be described in reference to FIG. 4. The process 400 starts when a party to the transaction accesses the system at step 401. The party then selects a transaction that requires updating at step 402. In one embodiment, the party is presented with a menu of options, from which the party may make a selection, for example, "update interactive HUD-1" is shown at step 404. Depending on the setup of the system for updating the interactive HUD-1, granting access to a party to update the HUD-1 may simply involve displaying the interactive HUD-1 and all fields that may be changed by the requesting party (the available fields for making changes may vary from party to party). In some implementations, the interactive HUD-1 may be password-protected for security. As shown at step 410, if the interactive HUD-1 is password-protected, the present invention prompts for the password at step 408 and will not permit access until the correct password is provided at step 406. After access is granted to the requesting party, the interactive HUD-1 with all available fields that may be changed by that party is displayed at step 412. The requesting party then selects a value to be changed and enters a new value at step 416. In one embodiment, prior to entry of the value, approval must be received from a designated party, such as an administrator of the interactive HUD-1. The approving party, however, may vary and may be, e.g., implementation-specific and/or transaction-specific.

In one embodiment, the administrator of the HUD-1 is notified of the potential change at step 420. At step 424, if the administrator approves the change, the party requesting the change is notified and the changed value is entered, as shown at steps 424 and 432. If the administrator does not approve the change, the changing party is again notified, and the change is not entered, as shown at steps 426 and 428. The selected value may, for example, revert to the value prior to the requested change, or a default value may be entered. In one embodiment of the present invention, the parties are notified by e-mail that a successful/unsuccessful change was made and/or attempted.

Next, at step 432, upon entry of the changed/updated value, the parties are notified at step 434. Afterward, the system determines whether the change involves additional payments, fees, or other expenditures at step 436. If the change does not involve such expenditures, then the process 400 ends at step 450. If the change involves the payment of fees, an invoice is prepared and sent to the payment system at step 438. The payment system manages the payment shown at step 440, as discussed above, and reports the payment at step 442. The present invention then updates the interactive HUD-1 with the changes and information at step 444, thereby concluding the process.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. A method for electronically facilitating a transaction, the method implemented on a suitably programmed computer comprising at least one processor, a data repository, and at least one user interface, the method comprising:
 a. receiving transaction information, via the at least one processor;
 b. generating, via the at least one processor, a transaction file that includes the transaction information;
 c. storing, via the at least one processor, the transaction file in the data repository;
 d. generating, via the at least one processor, a document based on the transaction file; and
 e. updating the transaction document, wherein updating the transaction document further comprises:
  i. receiving, via the at least one user interface, a change of at least one entry in one of the transaction file and the transaction document; and
  ii. receiving, via the at least one user interface, authorization for the change in the at least one entry in one of the transaction file and the transaction document by a designated party that is selected based on the transaction.

2. The method of claim 1, wherein the transaction is a loan.

3. The method of claim 1, wherein the transaction file is a virtual loan file.

4. The method of claim 2, wherein generating the interactive document further comprises determining whether at least one predetermined condition is satisfied.

5. The method of claim 4, wherein when the at least one predetermined condition is met, a final set of closing documents is generated for execution by at least one party to the loan transaction.

6. The method of claim 1, wherein updating the transaction document is performed by at least one party associated with the completion of the transaction.

7. The method of claim 6, wherein the at least one party is granted access to the transaction file.

8. The method of claim 2, wherein the transaction document is a HUD-1.

9. The method of claim 1, further comprising automatically ordering, via the at least one processor, at least one sub-transaction necessary to complete the transaction.

10. The method of claim 9, wherein the at least one sub-transaction relates to managing an escrow account.

11. The method of claim 9, further comprising automatically determining a timeframe for payment to a third party for fulfillment of the at least one sub-transaction.

12. The method of claim 1, further comprising automatically tracking, via the at least one processor, all pending and paid fees associated with the transaction.

13. A method for electronically facilitating a financial transaction, the method implemented on a suitably programmed computer comprising at least one processor, a data repository, and at least one user interface, the method comprising:
   a. receiving transaction information, via the at least one processor;
   b. generating, via the at least one processor, an electronic data file that includes the financial transaction information;
   c. storing, via the at least one processor, the electronic data file in the data repository;
   d. generating, via the at least one processor, an electronic document that includes at least some of the financial transaction information from the electronic data file; and
   e. updating the electronic document, wherein updating the electronic document further comprises:
      i. receiving, via the at least one user interface, a change of at least one entry in the electronic document; and
      ii. receiving, via the at least one user interface, authorization for the change in the at least one entry in the electronic document by a designated person that is selected based on the transaction.

14. The method of claim 13, wherein the electronic document is a HUD-1.

15. The method of claim 13, wherein the updated electronic document is not finalized until the authorization for the change is received.

16. The method of claim 13, wherein the financial transaction is a loan.

17. A system for electronically facilitating a financial transaction, the system comprising:
   a. at least one processor;
   b. at least one user interface operatively coupled to the at least one processor; and
   c. a data repository operatively coupled to the at least one processor, wherein the at least one processor is configured to
      i. receive information associated with the financial transaction;
      ii. store the information in an electronic file in the data repository;
      iii. generate at least one electronic document based on the received information; and
      iv. update the at least one electronic document based on changes made by a third party service provider.

18. The system of claim 17, wherein the at least one processor is further configured to generate a plurality of electronic documents.

19. The method of claim 1, wherein updating the transaction document comprises:
   i. receiving, via the at least one user interface, at least one of:
      a change of at least one entry in the transaction file causing a change in the transaction document, and
      a change of at least one entry in the transaction document;
   ii. receiving, via the at least one user interface, authorization for the change in the at least one entry in one of the transaction file and the transaction document by a designated party that is selected based on the transaction; and
   iii. changing, via the at least one processor, the transaction document based on the received change.

\* \* \* \* \*